No. 690,727. Patented Jan. 7, 1902.
D. D. HITCHINGS.
STREET SWEEPER.
(Application filed Mar. 14, 1901.)
(No Model.) 2 Sheets—Sheet 1.

Witnesses
Inventor
David D. Hitchings
by Geo. A. S. Hamlin
his Attorney

No. 690,727. Patented Jan. 7, 1902.
D. D. HITCHINGS.
STREET SWEEPER.
(Application filed Mar. 14, 1901.)
(No Model.) 2 Sheets—Sheet 2.

Witnesses
Inventor
David D. Hitchings
his Attorney

UNITED STATES PATENT OFFICE.

DAVID D. HITCHINGS, OF NORFOLK, VIRGINIA.

STREET-SWEEPER.

SPECIFICATION forming part of Letters Patent No. 690,727, dated January 7, 1902.

Application filed March 14, 1901. Serial No. 51,182. (No model.)

*To all whom it may concern:*

Be it known that I, DAVID D. HITCHINGS, a citizen of the United States, residing at Norfolk, county of Norfolk, State of Virginia, have invented certain new and useful Improvements in Street-Sweepers, of which the following is a specification.

This invention relates to street-sweepers.

One of the objects of the invention is the provision of a street-sweeper having improved and novel sweeping mechanism and operating mechanism therefor adapted to be removably attached to a cart provided with suitable traction-wheels, which will receive the material swept up, thereby obviating the necessity for employing an independent receptacle, and thus making provision for the rapid detachment of the sweeping mechanism from the cart to permit the same to be carried off to the dump and the sweeping mechanism applied to another cart of similar construction to fill the same while the first cart is being dumped.

A further object is the provision in a street-sweeper of the type employing a rotary brush and elevating carrier or apron, operated from the wheel of the cart, of novel means, whereby the carrier or apron and the operating-chains can be tightened.

A still further object is to provide in a street-sweeper novel sweeping mechanism which can be adjusted in relation to the cart in an improved way, so as to render the sweeping mechanism inoperative and clear of the ground.

Other objects of the invention are the provision of a street-sweeper of few parts and comparatively light and inexpensive construction and strong and durable in operation and one which will be so housed and covered in a novel way that the dust or material swept up cannot escape to contaminate the atmosphere, but will be caught and inclosed in a manner to avoid the escape thereof.

Having the foregoing objects in view, my invention consists of a street-sweeper comprising certain improved features and novel combinations and arrangements of parts, as described fully hereinafter and set up in the appended claims.

Figure 1:
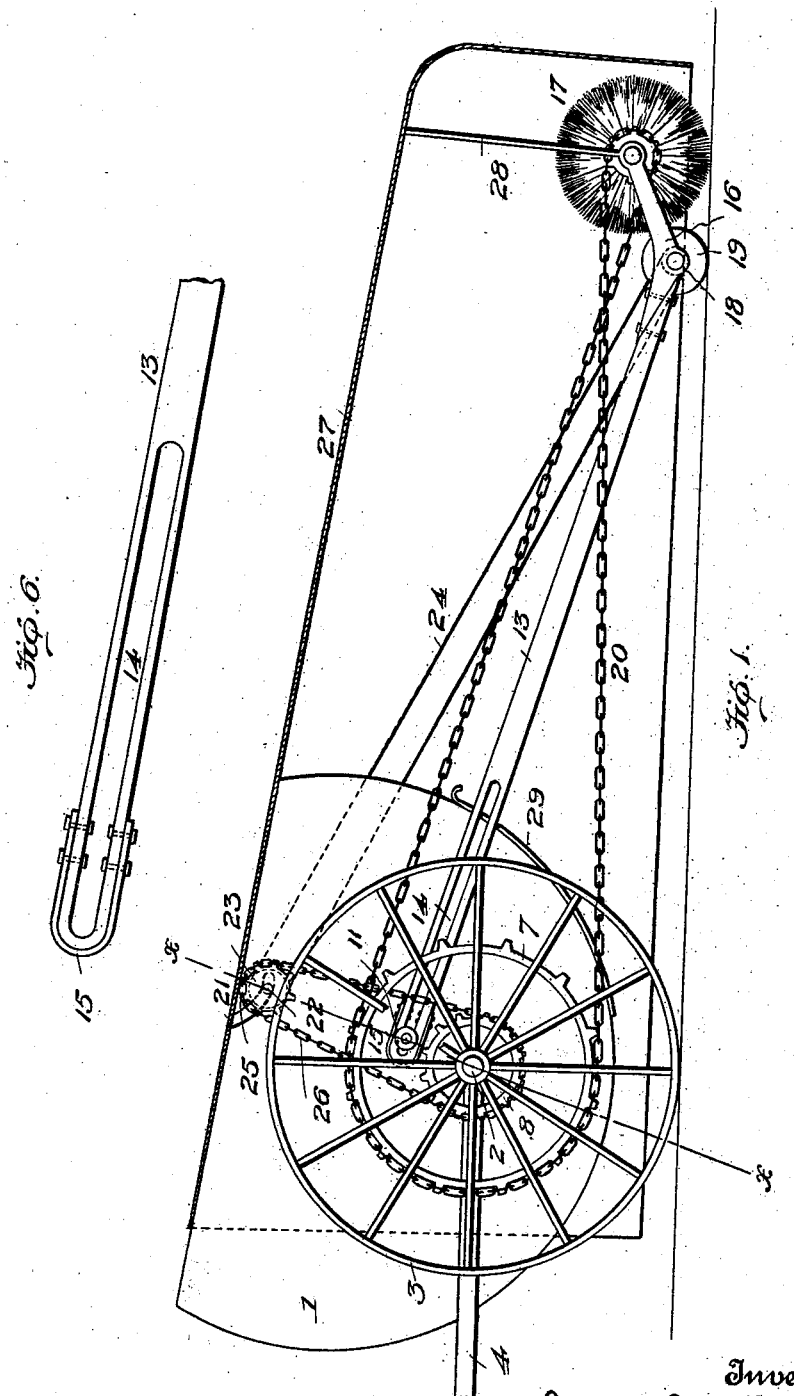
Figure 2:
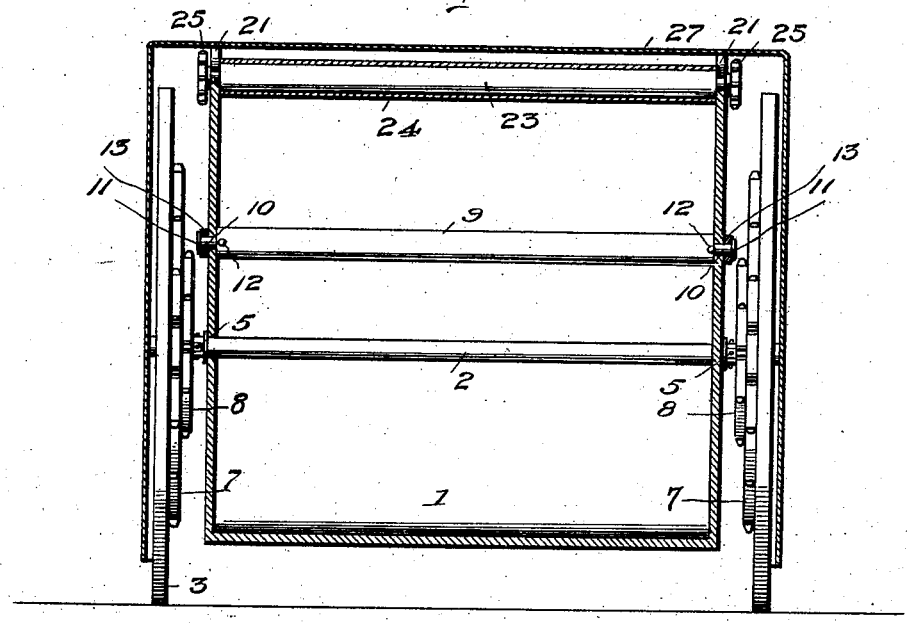
Figure 3:
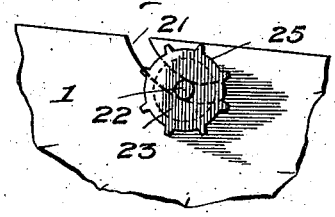
Figure 4:
Figure 5:
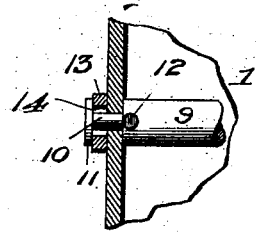

In the accompanying drawings, Figure 1 is a side elevation with the cover in sectional and full lines; Fig. 2, a transverse section taken on the line $x$ $x$ of Fig. 1, with certain parts shown in full lines; Fig. 3, a detail view illustrating the construction for adjusting the upper roller of the apron; Fig. 4, a detail of the detachable connection between the draft-shafts and the axle; Fig. 5, a detail illustrating the connection at the ends of the stay for securing the arms; and Fig. 6, a detail of the arms at their upper ends.

I employ a cart 1, having an axle 2, on which are the traction-wheels 3. The cart is adapted to be drawn by one or two horses (although motive power could be used) by draft-shafts 4, whose rear ends are connected to the axle 2 immediately adjacent the sides of the cart by the connection illustrated in Fig. 4, consisting of eyebolts 5, extending through the axle, and hooks 6 on the shafts. The shafts can by this construction be readily detached from the axle. Each wheel has secured to its inner face, by attachment to its spokes, a gear-rim 7 and a smaller gear-rim 8, concentric therewith. Within the cart is a stay 9, having reduced ends 10 where it passes through the cart, nuts 11 being provided at the extremities of the ends. Pins 12 pass through the stay next the sides of the cart, and the stay is thus held rigid against movement in any direction. The sweeping mechanism proper is carried by arms 13, which are provided with long slots 14 and reinforced at their upper ends by metal straps 15, and these arms lie flat against the sides of the cart with the reduced ends 10 of the stay positioned in the slots 14 and the nuts 11 bearing against the outer faces of the arm. Provision is thus made for loosening the nuts and raising and sliding the arms forward as far as desired and again clamping the nuts to hold the sweeping mechanism raised and clear of the ground when this is desirable.

The arms 13 are at their lower ends provided with brackets 16, in the upper portion of which is journaled the brush 17, while the journals of the lower roller of the endless apron or carrier are journaled in the lower portion of the bracket at 18 and are provided with rollers or wheels 19, which travel on the ground and support the mechanism while in operation. The brush 17 is operated from the gear 7 by a crossed link chain 20, so that it will operate reversely to the rotation of the traction-wheels of the cart.

The upper portions of the sides of the cart have cut thereinto the downwardly-disposed slots 21, which are curved at their lower ends and open at their upper ends, these slots receiving the journals 22 of the upper roller 23 for the endless carrier or apron 24, which runs over this roller and the roller journaled in the brackets 16. The journals 22 are equipped with gears 25, which are operated from the gears 7 by the link chain 26. By preference the carrier 24 is of canvas, so that it will readily carry up the dust and material thrown onto it by the rotary brush 17, and I find it preferable to have the diameters of the rollers 23 and the lower roller over which the carrier operates bear the approximate ratio of four to one in order that the ordinary rate of rotation of the wheels 19, caused by their travel on the ground, may not be altered. There is a coöperation or coadjustment between the carrier 24 and the chain 26 and gear 25, because of which I provide the peculiarly-shaped slots 21. The canvas carrier being operated by friction of the rollers must be kept properly tight, as must also the chain 26, in order that the same may operate the upper roller 23. The carrier is tightened by lacing the ends together in the manner that a belt is laced, which will draw on the roller 23, and if the latter were allowed to be so moved that the chain 26 slackened the latter would slip. I therefore provide the slots 21, which by their curvature keep the chain 26 taut, as the carrier is adjusted or tightened, and any taking up of slack in the carrier by relacing only tends to throw the journals in the slots against the upwardly-curved lower ends thereof.

In street-sweeping an important factor is to confine the dust and not allow it to spread through the atmosphere. To prevent any dissemination of the dust swept up, I provide the cover 27, which is preferably of canvas, the same extending over the top of the cart and down to within a few inches of the ground and completely housing all of the parts, and as the brush and the carrier and cart are completely inclosed the swept-up material cannot escape. This cover is conveniently supported above the brush by a frame 28, rising vertically from the brackets 16.

I find it preferable to have the cart provided with a vertically-sliding door 29, covering an opening in its bottom, so that upon raising this door the contents of the cart can readily be dumped.

In situations where it is a matter of expediency or economy to employ two or more carts and only one sweeping mechanism my invention will be found extremely valuable on account of the facility with which the sweeping mechanism proper can be detached from the cart to allow the latter to be taken to the dump for the removal of its contents and the attachment meanwhile of the sweeping mechanism to another cart of similar form, so that the sweeping operation may be carried on with no appreciable interruption. To detach the sweeping mechanism, it is only necessary to unloosen the nuts 11, throw off the chains, and remove the cover, arms, upper roller, and the attached parts.

Having thus described my invention, what I claim as new, and desire to secure by Letters Patent, is—

1. In a street-sweeper, the combination with a wheeled cart, of arms having slots, a stay extending across the cart and having reduced ends passed through the sides of the cart and projecting into the slots, nuts on the extremities of said ends, and sweeping mechanism carried by the arms adapted to elevate the material into the cart.

2. In a street-sweeper, the combination with a wheeled cart, of arms connected thereto, a roller carried by the arms, a movable or shiftable roller, guides on the cart having portions receiving the journals of said movable roller, which portions are disposed upwardly in relation to the wheels of the cart and the roller on the arms, a chain operatively connecting said movable roller to the wheels of the cart, and an endless carrier or apron running over the rollers, whereby as the carrier is tightened or its slack taken up, the movable roller will be moved and the tension on the chain tightened.

3. In a street-sweeper, the combination with a wheeled cart, of arms connected thereto, a roller carried by the arms, a roller carried by the cart, an endless carrier operating over said rollers, gearing interposed between the wheels of the cart and the endless carrier to operate the same, a rotary brush carried by the arms, a chain operatively connecting the brush with the wheels of the cart, and a cover connected to the cart and extending across the top thereof and down close to the ground on the outside of the cart-wheels and inclosing the cart and all of the said sweeping mechanisms, said cover being supported at its rear end from the arms.

In testimony whereof I hereunto affix my signature in presence of two witnesses.

DAVID D. HITCHINGS.

Witnesses:
 FRANK E. NEWTON,
 GEO. R. HAMLIN.